Dec. 14, 1965 D. H. ELLIS 3,222,709
DOOR CLOSING MECHANISM
Filed Jan. 7, 1963 5 Sheets-Sheet 1

INVENTOR:
DAVID H. ELLIS
BY
*Rummler & Snow*
ATT'YS

Dec. 14, 1965

D. H. ELLIS 3,222,709

DOOR CLOSING MECHANISM

Filed Jan. 7, 1963

INVENTOR:
DAVID H. ELLIS
BY
ATT'YS

Dec. 14, 1965   D. H. ELLIS   3,222,709
DOOR CLOSING MECHANISM
Filed Jan. 7, 1963   5 Sheets-Sheet 3

INVENTOR:
DAVID H. ELLIS
BY
*Kummler & Snow*
ATT'YS

Dec. 14, 1965  D. H. ELLIS  3,222,709
DOOR CLOSING MECHANISM
Filed Jan. 7, 1963  5 Sheets-Sheet 4

INVENTOR:
DAVID H. ELLIS
BY
ATT'YS

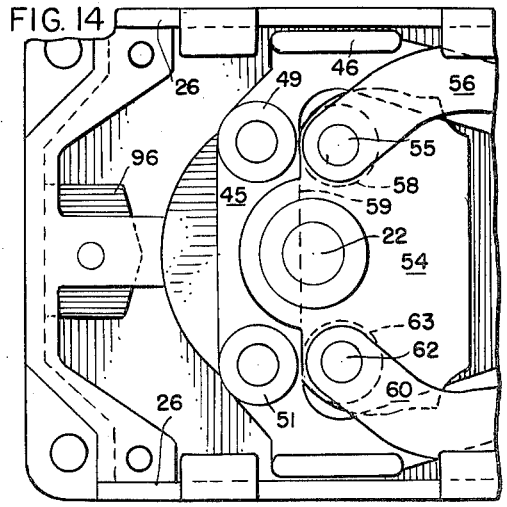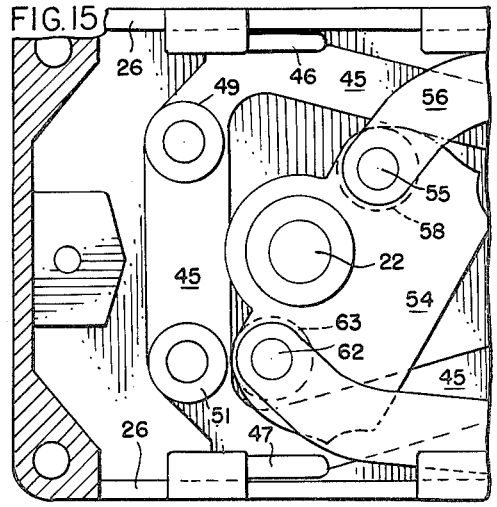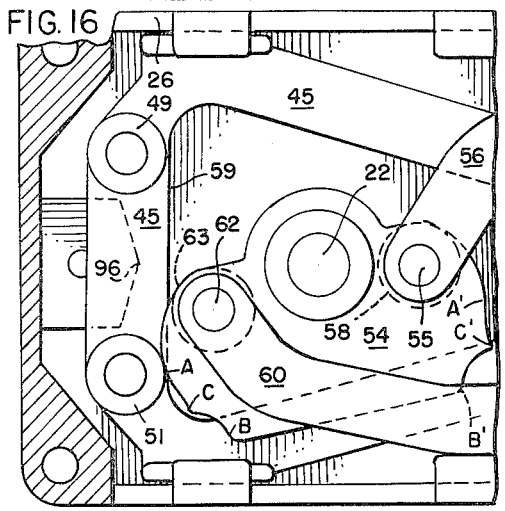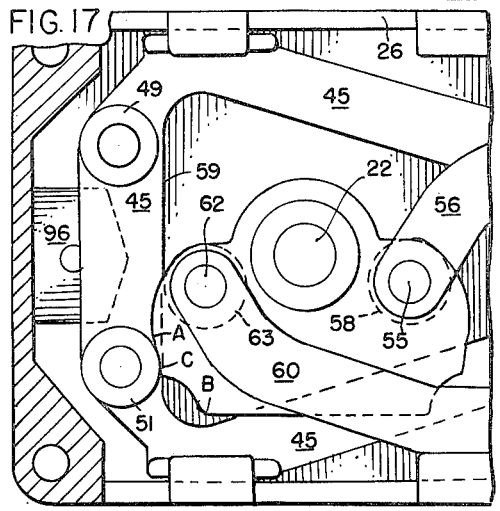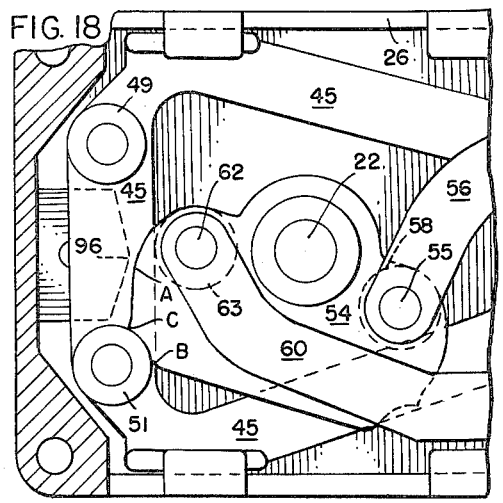

United States Patent Office 3,222,709
Patented Dec. 14, 1965

3,222,709
DOOR CLOSING MECHANISM
David H. Ellis, West Chicago, Ill., assignor to Rixson, Inc., Franklin Park, Ill., a corporation of Illinois
Filed Jan. 7, 1963, Ser. No. 249,699
8 Claims. (Cl. 16—55)

This invention relates to a mechanism for closing a door. More in particular this invention relates to a door closing mechanism of an improved type wherein the torsional force required to open the door beyond a predetermined angle with respect to its closed position is sharply increased in comparison with the force required to open the door to a degree less than the predetermined angle.

Particularly in two-way acting doors which permits a door to open both inwardly and outwardly it is most desirable to fulfill several conditions. First there should be a positive force of appreciable magnitude for maintaining the door in its closed position. Second, there should be means provided for requiring a force of appreciable magnitude to move the door from its closed position to an angle of a few degrees toward the open direction. This inhibits opening of the door by wind. Third, it is desirable that the manual force required to open the door for ingress and egress by persons, under normal conditions, up to a predetermined angle with respect to closed positions, e.g. 70° should be of a low order. Fourth, in order to inhibit opening of the door beyond the predetermined angle (e.g. 70°) the force required to open the door beyond this angle should be of a much higher magnitude, e.g. 200–300% or more. Fifth, it should be provided with means for holding the door in wide open position including stop means for opening the door beyond hold-open position. Sixth, there should be means for providing a force urging the door toward closed position, and seventh, there should be means for controlling the rate of speed of the door as it moves toward closed position.

One of the principal features of the present invention is the provision of mechanical means for sharply increasing the force requirement when the door reaches a predetermined angle (e.g. 70°) during its opening movement. This feature prevents the door from being slammed against its backstop which may damage the door and its closing mechanism. Another feature is the provision of a high resistance means against initial movement of the door from its closed position, thus inhibiting air leakage when the door is closed.

It is a principal object of the present invention to provide a door closing mechanism which requires a high force to open the door beyond a predetermined angle.

Another important object of this invention is to provide a door closing mechanism which provides a positive force to maintain the door in its closed position.

A further important object of this invention is to provide a door closing mechanism which requires a force of appreciable magnitude to open the door within the range of a few angular degrees from its closed position.

A still further object of the present invention is to provide a door closing mechanism which requires a low force to open the door beyond its initially opened position to a predetermined angle.

A yet further object of the present invention is to provide a door closing mechanism which adjustably controls the rate of speed that the door is permitted to move toward closed position.

Another important object of the present invention is to provide a door closing mechanism according to the preceding objects which is compact in size such that it is adapted for hidden from view installation within a recess positioned in the casing for supporting the door.

These and other desirable and important objects of the invention will become apparent from the ensuing description of a preferred embodiment, the appended claims and the annexed drawings wherein:

FIGURE 14 is enlarged fragmentary plan view similar to FIGURE 4 except that it shows the position of certain mechanical components when the door is in neutral or closed position;

FIGURE 15 is a view similar to FIGURE 14 except that it shows the relation of the parts when the door is opened to about 30° with respect to closed position;

FIGURE 16 is an enlarged view similar to FIGURE 4 showing the relation of the parts when the door is opened to about 70° with respect to closed position.

FIGURE 17 is an enlarged view similar to FIGURE 5 showing the relation of parts when door is opened 90° with respect to its closed position and is approaching hold-open position; and FIGURE 18 is similar to FIGURE 17 but shows the relation of the parts when the door is opened to about 105° with respect to closed position and is in its hold-open position.

Figure 1:
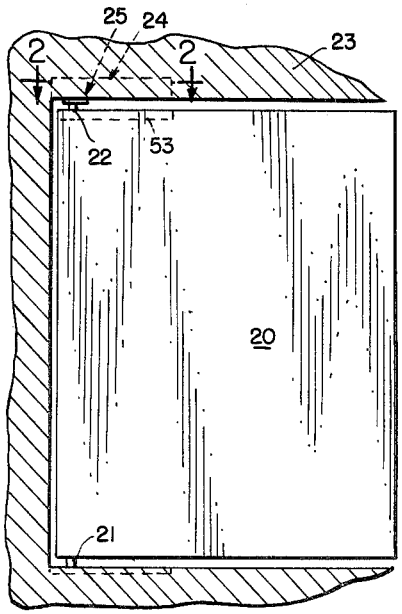
FIGURE 1 is a vertical section, partly broken away, illustrating a door supported by its casing with a door closing mechanism of this invention installed, in operative relation with the door, within a recess disposed in the casing.

Referring to the drawings, in FIGURE 1 there is shown a door 20 pivotally supported for swinging movement about vertically alined shafts 21 and 22 positioned in the door casing 23. The upper portion of the door casing 23 is provided with a generally rectangular shaped recess 24 adapted to accommodate in secured relation the door closing mechanism 25.

Figure 2:
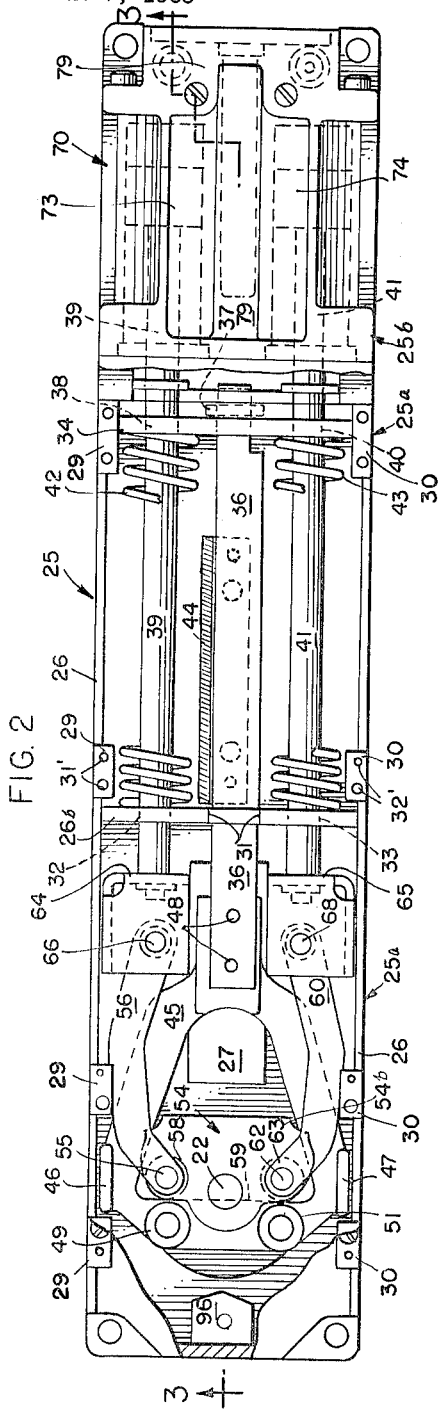
FIGURE 2 is plan view of the door closing mechanism of this invention, partly broken away, taken on line 2—2 of FIGURE 1, and illustrating the general arrangement of the mechanism.
Figure 3:
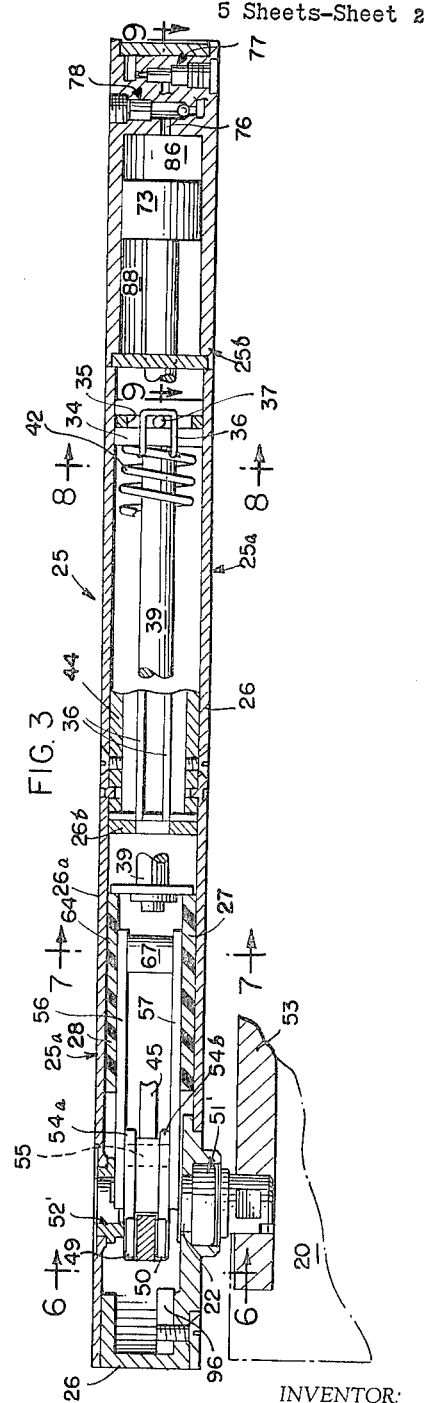
FIGURE 3 is a sectional view, partly broken away, taken on line 3—3 of FIGURE 2, illustrating further details not apparent from FIGURE 2.

The door closing mechanism 25 basically comprises a mechanical section 25a and a hydraulic section 25b as indicated generally in FIGURES 2 and 3. For convenience the mechanical section 25a will now be described.

In FIGURES 2 and 3 the mechanical section 25a includes a stationary frame or housing 26 with a removable cover plate 26a and a partition or stationary wall 26b secured rigidly to the housing 26. Horizontal guide plates 27 and 28 are rigidly secured to the inner bottom of the housing 26 and to the inner surface of the cover plate 26a, respectively. These guide plates are preferably of Teflon, or other suitable low friction material and are integral parts of the housing structure. A convenient means for securing the cover plate 26a onto the housing 26 is to form inwardly extending lugs 29 and 30 on the opposite sides of the frame (FIGURE 2). The cover plate 26a is then secured to the lugs 29 and 30 as by means of screws (not shown) employing threaded bores 31' and 32' in a conventional manner.

The partition wall 26b is provided with a slot 31 and holes 32 and 33 therethrough to accommodate movable parts as hereinafter explained.

Figure 8:
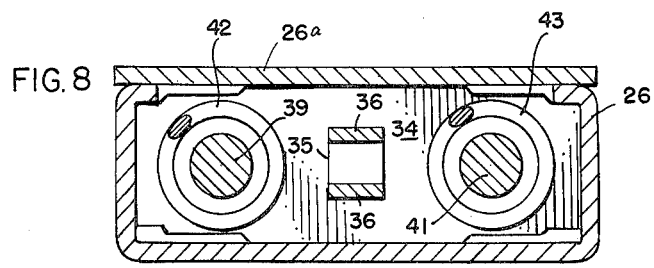
FIGURE 8 is a vertical section, taken on line 8—8 of FIGURE 3, showing the details of a movable driving plate in seating relation with compression springs.
Figure 10:
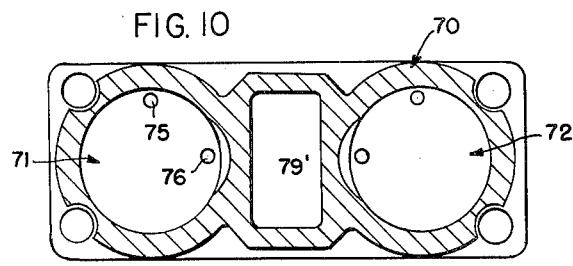
FIGURE 10 is a vertical section taken on line 10—10 of FIGURE 9 illustrating the ports in the hydraulic cylinders and the fluid expansion chamber and reservoir.

Disposed in the rightward end portion of the mechanical section 25a, as viewed in FIGURES 2, 3 and 8 is a transversely disposed horizontally movable wall 34. The movable wall 34 is guided for horizontal travel by the bottom and sidewalls of the housing 26 in slidable relation. In the central portion of the movable wall 34 is a slot 35 through which extends one end of parallel members comprising drawbar 36. The rightward end of the drawbar 36 is connected to the movable wall 34 in a conventional manner, such as bracket 37, whereby leftward movement of the drawbar 36 necessarily pulls the movable wall 34 leftwardly therewith.

Also, within the movable wall 34 adjacent one end is a hole 38 in alinement with hole 32 of the wall 26b which accommodates a piston rod 39 therethrough in slidable relation. Similarly the movable wall 34 is provided with a hole 40 adjacent its other end in alinement with hole 33 for accommodating piston rod 41 in slidable relation therethrough.

Disposed in concentric relation about the piston rod 39 is a compression spring 42 one end thereof being in engaged relation with the stationary wall 26b and the other end in engaged relation with the movable wall 34 as shown in FIGURE 2. Likewise disposed about the piston rod 41 in concentric relation is compression spring 43 in engaged relation with walls 26b and 34. The springs 42 and 43 should be strong and of equal compression characteristics so that the force exerted by each on the movable wall 34 is substantially equal. From this it will be apparent that if sufficient tension is applied to the drawbar 36 in a leftward direction it will move leftwardly and the corresponding leftward movement of the movable wall 34 further compresses the springs 42 and 43. Thus the springs 42 and 43 urge the wall 34 and its associated drawbar 36 in a rightward direction as viewed in FIGURE 2. A longitudinally extending channel shaped stiffening element 44 (FIGURE 2) may be secured to the bottom and the top of the housing 26 for maintaining rigidity of the housing structure, which is preferable formed of sheet steel.

Referring now to the portion of the mechanical section 25a to the left of the stationary wall 34 as viewed in FIGURES 2 and 3, the leftward end of the drawbar 39 includes a rigidly connected stirrup 45 of a generally triangular interiorly open shape. The stirrup 45 is provided at each side with guide elements 46 and 47 in slidable relation with the respective sidewalls of the housing 26 which permits the stirrup 45 to move slidably in a horizontal direction with corresponding movement of the drawbar 36. The rigid connection between the drawbar 36 and the apex of the triangular stirrup 45 may be by conventional means such as rivets 48 shown in FIGURE 2.

Figure 6:
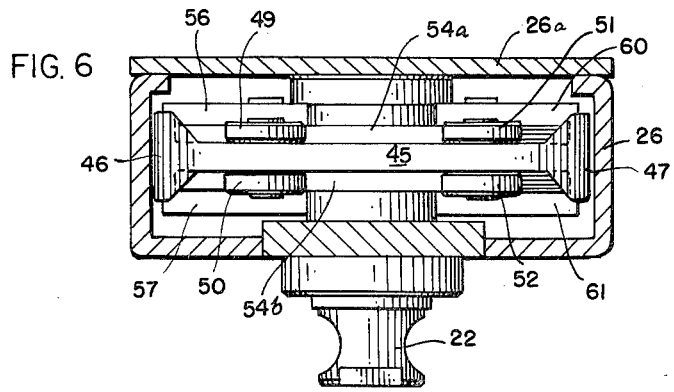
FIGURE 6 is a vertical section taken on line 6—6 of FIGURE 3 illustrating in detail the position of cam engaging rollers mounted on the stirrup.

Referring to FIGURES 2 and 6 it will be seen that the leftward end portion or base bar of the stirrup 45 is provided with a pair of vertically aligned rollers 49 and 50 adjacent one end and another pair of vertically aligned rollers 51 and 52 adjacent its opposite end as shown. It will also be observed that the pair of rollers 49, 50 are disposed on opposite sides of the stirrup base bar and in horizontally spaced relation with respect to the similarly disposed pair of rollers 51, 52. The means for mounting the rollers 49, 50, 51 and 52 on the stirrup 45 is conventional, it being suffice to say that each of the rollers is rotatable about its respective vertical axis with reference to the stirrup 45.

In FIGURE 3 it will be seen that the housing 26 is provided with a bearing 51' in vertical alinement with bearing 52' disposed in the cover plate 26a. The bearings 51' and 52' rotatably support the vertical shaft 22 forming a pivot relation with respect to the door 20.

The lower end of the shaft 22 is rigidly connected to a horizontally extending arm 53 which is seated in a recess disposed in the upper horizontal edge of the door 20 and rigidly secured thereto as by bolts or screws (not shown). Thus it is apparent that any rotational movement of the door 20 about its vertical axis formed by the alined shafts 21 and 22 (FIGURE 1) correspondingly rotates shaft 22 with respect to the housing 26 (FIGURE 2).

Secured in rigid relation to the shaft 22 is a camming member generally indicated at 54 (FIGURE 2). The camming member 54 consists of two identically shaped elements 54a and 54b positioned in vertically spaced relation and each being in rigidly secured relation with the actuating shaft 22 and having opposed arms extending radially therefrom. As will be seen from FIGURE 3 the camming member element 54a is positioned immediately above the end bar of the stirrup 45 and in horizontal alinement for engagement with rollers 49 and 51. Similarly the cam member element 54b is positioned immediately below the end bar of the stirrup 45 and in horizontal alinement for engagement with rollers 50 and 52. The peripheral contours of cam elements 54a and 54b coincide with each other in the vertical direction and since they are identical in construction they function together as a single camming member 54. As will be seen later that the functional camming surfaces or working peripheral edges of cam member 54 extend from point A to point B (FIGURE 16) and from point A' to point B' only.

Figure 7:
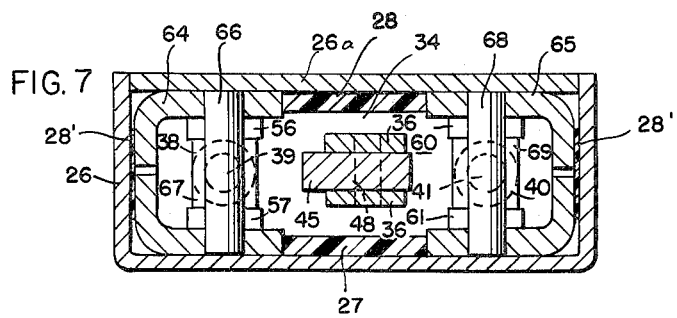
FIGURE 7 is a vertical section, taken on line 7—7 of FIGURE 3, showing construction details of the link arm connections to piston rods.

As will be seen from FIGURE 3 there is connected pivotally at 55 to the cam member 54 a pair of vertically spaced link elements 56 and 57. On the pivot shaft 55 between the cam elements 54a and 54b is a roller bearing member 58 which is positioned for engagement with the rearward inner edge 59 of the end bar of stirrup 45. Likewise in lateral spaced relation as viewed in FIGURE 2 a second pair of link elements 60 and 61 (FIGURE 7) are pivotally connected at 62 with the pivot shaft 62 supporting a roller cam member 63 between the cam elements 54a and 54b whereby the roller 63 is positioned for engagement with the inner edge 59 of the stirrup 45. When the door 20 is in closed position the stirrup 45 is fully retracted by the springs 42–43 and both of the rollers 58 and 63, which constitute first bearing members or means on the camming member 54, are engaged with the inner edge 59 of the stirrup end bar as shown in FIGS. 2 and 14. It will thus be apparent from FIGURES 14 to 18 that as the actuating shaft 22 rotates the cam member 54 in a clockwise direction the roller 63 is engaged with the inner edge 59 of the stirrup 45 and as it rolls along the edge 59 the stirrup 45 and its associated drawbar 36 are moved leftwardly. During such clockwise movement the roller 58 becomes disengaged from the inner edge 59 of stirrup 45. On the other hand if the actuating shaft 22 is rotated in a counter-clockwise direction the roller 58 remains engaged with the inner edge 59 of the stirrup 45 and as it rolls along the edge 59 the stirrup 45 is moved leftwardly and the roller 63 becomes disengaged from the inner edge 59 of stirrup 45.

Referring now to FIGURE 2 it will be seen that a bracket 64 is rigidly connected to the leftward end of the piston rod 39. Similarly, a bracket 65 is symmetrical to bracket 64 and is rigidly connected to the piston rod 41. Both brackets 64 and 65 are slidable horizontally with respect to the housing 26 and its cover plate 26a, and their inner edges engage the lateral edges of the guide plates 27 and 28, as is apparent from FIGURE 7. Also, as indicated at 28' in FIGURE 7, Teflon strips are bonded to the outer faces of the brackets 64 and 65 for low-friction bearing on the casing sidewall. The bracket 64 is provided with a vertical pin 66 which is pivotally connected to the ends of link elements 56 and 57 as shown. A sleeve or spacer element 67 is positioned vertically on the pin 66 between the link elements 56 and 57 thereby maintaining the elements 56 and 57 in vertically spaced relation as is evident from FIGURE 7. Likewise the bracket 65 is provided with a vertical pin 68 which is pivotally connected to the ends of link elements 60 and 61 as shown. Also a sleeve or spacer element 69 is positioned vertically on the pin 68 between the link elements 60 and 61 thus maintaining the elements 60 and 61 in vertically spaced relation.

Returning now to FIGURE 2 it will be evident that if the door 20 (FIGURE 1) is opened in either direction from the closed position illustrated in FIGURE 2, corresponding rotation of the actuating shaft 22 causes one of the rollers 58 or 63 on the cam 54 to drive the stirrup 45, by contact with the inner edge 59 thereof, in the leftward direction with its associated drawbar 36 thus compressing both springs 42 and 43 simultaneously through the leftward movement of the movable wall 34 rigidly attached to the drawbar 36. The piston rods 39 and 41 will move in opposite directions with respect to each other due to their connection with diametrically opposite ends of the cam member 54. From this it will be apparent when the door 20 is opened in either direction from the closed position of FIGURE 2, the springs 42 and 43 will always urge the rotation of shaft 22 to swing the door 20 in a direction toward closed position.

Now when the door 20 is opened to a predetermined angle in one direction with respect to its closed position the cam member 54 will have been rotated by shaft 22 to the position illustrated in FIGURE 16. In the embodiment shown the door 20 will, at this point, be opened to an angle of about 70° with respect to the closed position. At this predetermined angle (e.g. 70°) a transfer point is reached wherein the mechanical leverage utilizing the force of springs 42 and 43 is changed. Referring to FIGURE 16 it will be seen that the camming surface or peripheral edge of the cam member 54 at point A comes into engagement with rollers 51, 52 on stirrup 45 but the roller 63 is still in engagement with the inner edge 59 of stirrup 45. Now if the door 20 is opened further or beyond the transfer point A the roller 63 leaves the stirrup surface 59 and the cam means at the end of the respective arm of member 54 rides on the rollers 51–52 and sharply increases the rate of leftward movement of the stirrup 45. The force of the springs 42 and 43 is thus applied to the cam member 54, through the rollers or bearing members 51–52, at a much greater mechanical advantage. Thus the resistance to opening of door 20 beyond the transfer point, from that shown in FIGURE 16 to the position illustrated in FIGURE 17, is much greater than the resistance to opening the door 20 from the position illustrated in FIGURE 15 to that of FIGURE 16. In short the mechanism 25 functions as a mechanical "back-check" when sufficient force is applied, or an attempt is made, to open the door 20 beyond the transfer point (e.g. 70°) and it prevents the door from being violently opened to or beyond its hold-open position by shifting the mechanical leverage sharply in favor of the springs 42 and 43.

Now if the door 20 is opened against the back-check resistance as above described to the point where the rollers 51 and 52 pass point C of cam member 54 (FIGURES 16, 17 and 18) the rollers engage the circular section of the cam means periphery between points C and B as shown in FIGURE 18. The point C on cam member 54 is reached when the door 20 is opened to about 90° and when the door reaches the hold-open position shown in FIGURE 18 the door 20 is about 105° from its closed position. Further movement of the door 20 results in the cam member 54 engaging a stationary stop member 96 rigidly connected to the stationary housing 26.

From the above it will be apparent that if the door 20 is opened in the opposite direction from that just described, rollers 49, 51 and 58 will function in the same manner with respect to points A', B' and C' of the cam member 54. However, it should be noted that the periphery of the cam member 54 performs no camming functions unless the door 20 is opened in either direction beyond the transfer points A or A' of cam member 54. Below the transfer points A or A' the force of springs 42 and 43 is transmitted to the door 20 by the inner edge 59 of the stirrup 45 bearing on one or the other of the cam rollers 58–63.

Now it will be appreciated from the above that if a person opens the door 20 to an angle less than point C of FIGURE 16 (i.e. 90°) and then releases it, the door 20 would move rapidly toward closed position by the potential energy stored within the springs 42 and 43. This would of course be undesirable and hydraulic dashpot means will now be described for controlling the rate or speed at which the springs 42 and 43 are permitted to close the door 20.

Figure 4:
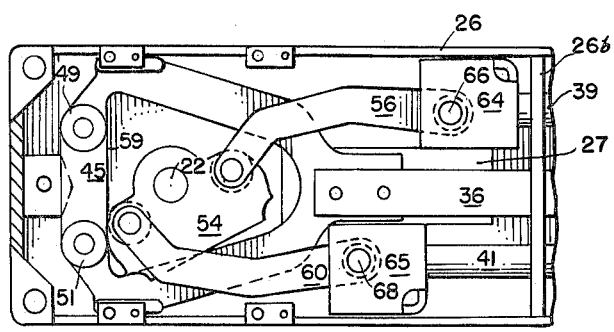
FIGURE 4 is a fragmentary plan view showing the leftward portion of FIGURE 2 but illustrating the position of certain components when the door has been opened to a force transfer point wherein the force requirement to open the door further is of high magnitude.
Figure 5:
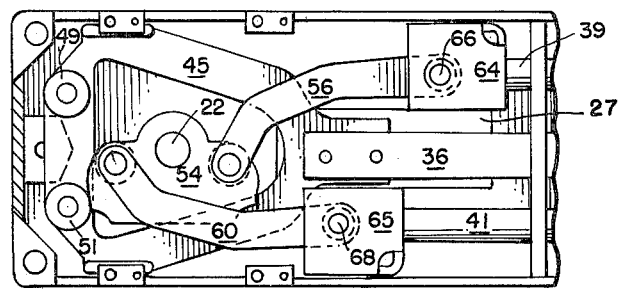
FIGURE 5 is similar to FIGURE 4 except that it shows the position of the components when the door has been opened to an angle approaching hold-open position.

Referring to FIGURE 2 the dashpot or hydraulic section 25b of the door closing mechanism 25 includes a casing, indicated at 70, removably secured rigidly to the housing 26 at the rightward end thereof. The casing 70 is provided with a pair of hydraulic cylinders, indicated generally at 71 and 72 in FIGURE 9. The cylinder 71 is in alinement with piston rod 39 and is provided with a piston 73 connected thereto. Likewise cylinder 72 is in alinement with piston rod 41 and is provided with a piston 74 connected thereto. From FIGURES 4 and 5 it will be appreciated that when the door 20 is moving in one direction or the other one of the pistons 73 or 74 will move retractively, to the right in FIG. 9, while the other piston moves expansively or to the left in FIG. 9. It will also become apparent later herein that the cylinders 71 and 72 function as a dashpot to restrict the rate of movement of the respective pistons only when the pistons are moving in a retractive direction and that the cylinders are unrestrictive when the pistons are moving in the expansive direction. Since the closing movement of door 20 may be in either direction it follows that it is only necessary to control the retractive movement of the particular piston which had been moved expansively during the opening of the door.

Referring now to FIGURES 9, 10, 11, 12 and 13, it will be seen that cylinder 71 is provided with two fluid ports at 75 and 76. The port 75 leads to one side of an adjustable fluid flow restriction valve indicated at 77 and port 76 leads to a combination check valve and relief valve indicated at 78. The other side of the restriction valve 77 communicates with a fluid reservoir 79 through passage 80. The port 76 leads to the outlet side of the ball check valve 81 and to the inlet side of the relief valve 82 of the combination valve 78. The inlet side of the check valve 81 communicates with the reservoir 79 through passage 83 and the outlet side of the relief valve 82 also communicates with the reservoir 79 through the passage 84.

Figure 12:
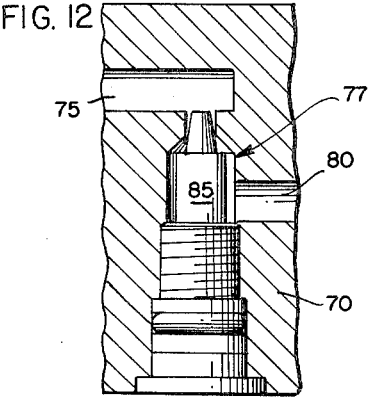
FIGURE 12 is a fragmentary vertical section taken on line 12—12 of FIGURE 9 showing an enlarged view of one adjustable restriction valve.

Referring to FIGURE 12 it will be seen that the restriction valve 77 permits restrictive flow between port 75 of cylinder 71 and the reservoir 79. The valve 77 is of the conventional needle type wherein the restriction can be adjustably controlled by rotation of the valve body in the threaded bore of the casing 70. Thus the valve 77 permits restrictive fluid communication between cylinder chamber 86 and reservoir 79 in either direction.

Figure 13:
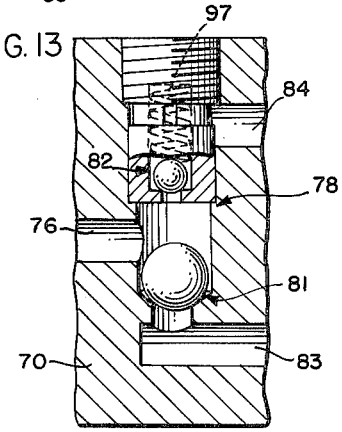
FIGURE 13 is a fragmentary vertical section taken on line 13—13 of FIGURE 9 showing one check valve and one adjustable pressure relief valve arrangement.

The ball check valve 81 of FIGURE 13 precludes fluid flow therethrough to the reservoir 79 from the cylinder chamber 86 but if the fluid pressure in the chamber 86 exceeds a predetermined value then the relief valve 82 opens to discharge excessive fluid pressure from the cylinder chamber 86 to the reservoir through port 76 and passage 84. The opening pressure of relief valve 82 may be adjusted conventionally by regulating the compressive force of its spring 97.

Fluid movement to and from chamber 87 of cylinder 72 and the reservoir 79 is accomplished in the same manner as described above for cylinder 71 employing restriction valve 77' identical to valve 77 and combination check valve and relief valve 78' identical to the combination valve 78 and it is not deemed necessary to repeat the details thereof. It may therefore be assumed that the valving of cylinder 72 is the same as that described for cylinder 71.

Figure 9:
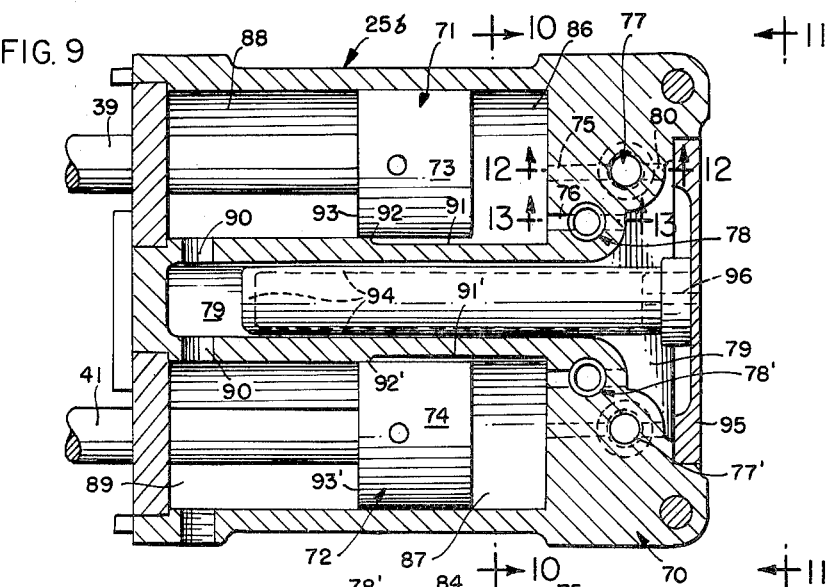
FIGURE 9 is a sectional view, partly broken away, taken on line 9—9 of FIGURE 3, showing construction details of the hydraulic dashpot components.
Figure 11:
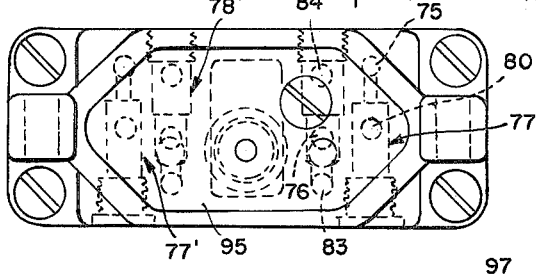
FIGURE 11 is an end view, taken on line 11 of FIGURE 9, of the hydraulic components showing the general arrangement of the check valves, adjustable pressure relief valves and adjustable flow restriction valves.

In FIGURE 9 it will be observed that both cylinders 71 and 72 include closed chambers 88 and 89 which are in direct communication with each other through passages 90. It will also be observed that the bore in the casing 70 for the cylinder 71 is proivded with an undercut groove 91 extending from the chamber 86 to a point or shoulder 92 slightly to the right of the face 93 of piston 73 as viewed in FIGURE 9. Similarly an undercut groove 91' is provided to the shoulder 92' slightly to the right of the face 93' of piston 74. The purpose of the undercut grooves 91 and 91' will be described later herein.

Again in FIGURE 9 it will be seen that the reservoir 79 includes a chamber 79' extending into the casing 70 between the cylinders 71 and 72. Within the chamber 79' is disposed a flexible plastic bag 94 shown in dotted lines in FIGURE 9. The open end of the plastic bag 94 is secured in sealed relation with the end plate 95 which is provided with a passage 96 communicating the interior of the bag 94 with the atmosphere. Thus the fluid in the reservoir 79 including its chamber 79' is always at substantially atmospheric pressure yet sealed from leakage. The material from which the bag 94 is constructed should be of the type unaffected by the hydraulic fluid such as Buna–N rubber or the like. Thus the hydraulic fluid is completely sealed from leakage but the reservoir 79 is always at substantially atmospheric pressure irrespective of temperature changes or the loss of hydraulic fluid through leakage from the cylinders 71–72. The operational dashpot characteristics of the hydraulic section 25b will now be explained.

It will be assumed that the door 20 is in closed inactive or neutral position in which case the position of the pistons 73 and 74 will be as illustrated in FIGURE 9. When a person initially applies a normal force to open the door 20, with clockwise rotation of the shaft 22 as viewed in FIGS. 2, 4, 5 and 14 the resistance to initial movement will be high because the pressure in cylinder chamber 86 will be elevated by retractive movement of the piston 73 and the exhausting of the fluid from chamber 86 to the reservoir 79 will be governed by the setting of the restriction valve 77. If on the other hand the person applies a strong or high force on the door 20 the pressure in the cylinder chamber 86 will rise sufficiently to open the relief valve 82 thus permitting the fluid to exhaust at a higher rate. This feature prevents gusts of wind from opening the door 20. Now when the person has moved the door about 3–5° from closed position the face 93 of piston 73 will move to the right of shoulder 92 at the adjacent or inner end of the undercut groove 91 opening a direct and relatively large passage from one side to the other of the piston. Thereafter fluid may additionally exhaust freely from chamber 86 to chamber 88 of cylinder 71 and the piston 73 may continue to move in a rightward direction with virtually no restriction. Meanwhile the piston 74 moves expansively and the check valve in the combination valve 78' (identical with check valve 81 of FIGURE 13) opens to permit free flow of fluid from the reservoir 79 into the chamber 87 of cylinder 72 thus allowing unrestrictive movement of piston 74 leftwardly as viewed in FIGURE 9.

When the person terminates force on the door 20 the potential energy of springs 42 and 43 urges it toward closed position. Therefore the pistons 73 and 74 reverse their respective direction of movement and piston 74 moves in a retractive direction toward the neutral position shown in FIG. 9. The check valve 81' in the combination valve 78' now closes and the rate at which the door 20 proceeds toward closing is governed by the restriction valve 77'. The force available from the large springs 42 and 43, even at fully closed position, is sufficiently great to ensure complete closing of the door 20 promptly.

Summarizing it can now be seen that when a person normally applies an opening force to the door 20 he encounters a high resistance until the door is initially opened (e.g. 3–5°) to a first transition point, i.e., where the piston face 93 or 93' reaches shoulder 92 or 92' respectively as viewed in FIGURE 9. Thereafter until a second transition point (e.g. the transfer point A at 70°) is reached the force required to further open the door 20 is of a low order being the progressive compression of springs 42 and 43, under a low degree of mechanical advantage for the springs. Upon reaching the second transition point (FIGURE 16) the mechanical advantage of the springs 42 and 43 is shifted immediately to a high degree which sharply increases the force necessarily applied by the person to open the door beyond the second transition point. The increased force is 200–300 percent greater than that required just prior to reaching the second transition point.

When the person releases the opened door 20 the spring system 42, 43, with its stored energy, now urges the door 20 toward closed position, unless the door was opened to the hold-open position of FIGURE 18. However, during closing movement one of the pistons 73 or 74 will move retractively and fluid from its respective chamber 86 or 87 is exhausted through the corresponding restriction valve 77 or 77' thus retarding the rate of closing the door 20. The mechanical advantage of the springs 42 and 43 shift back from high order to low order as soon as the door 20 passes the second transition point on closing direction. When the door 20 is closed (FIGURE 2) the springs 42 and 43 remain in compression as captive springs thus exerting an appreciable force to urge the door to remain in closed position.

It should also be understood that an elastic fluid such as air may be employed instead of hydraulic liquid if so desired.

Having described a preferred embodiment of the invention it can now be seen that the objects of the invention have been fully achieved and it must be understood that changes and modifications may be made which do not depart from the spirit of the invention nor from the scope thereof as defined in the appended claims.

What is claimed is:

1. A door closing mechanism for a swinging door comprising
    (a) a spindle having connection with the door on the pivot axis thereof,
    (b) a camming member fixed on said spindle for rotation therewith upon swinging movement of the door,
    (c) said camming member comprising an arm terminating in a radially facing first cam means of expanding radius and having a driving element, disposed radially toward said spindle adjacent said cam means and in a different plane, (d) a resiliently yieldable force means substantially surrounding said camming member positioned for engagement by said driving element for imposing a low resistance to rotation of said camming member during a predetermined extent of angular movement of the camming member in the door opening direction, and (e) bearing means mounted on said force means in a different plane and positioned for engagement by said first cam means when said camming member is rotated in the door opening direction beyond said predetermined extent of angular movement, (f) said first cam means acting with said bearing means to increase the resistance of said force means to the rotation of said camming member in the door opening direction.

2. A door closing mechanism as defined by claim 1 wherein the first cam means has an expanding radius from the axis of the spindle in the angular direction opposite the direction of door opening rotation of said spindle.

3. A door closing mechanism as defined by claim 1 wherein the force means comprises a lineally moveable drawbar having a transversely disposed stirrup bar at one end positioned for edgewise engagement with and substantially surrounding the said driving means, the said bearing means is mounted on said stirrup bar in the plane of said first radially facing cam means, and means are provided for normally urging the drawbar in the direction to force the stirrup bar against said camming member.

4. The door closing mechanism defined by claim 3 wherein the first cam means has an expanding radius from the spindle axis in the angular direction opposite the door opening rotation of the spindle.

5. For a swinging door, a door closing mechanism comprising (a) a rotatable spindle having driving connection with the door on the pivot axis thereof, (b) a camming member fixed on said spindle for rotation therewith upon swinging movement of the door, (c) said camming member comprising an arm extending radially from the spindle and terminating in a first cam means facing radially outward from the spindle, (d) a driving element mounted on said arm in radially spaced relation toward said spindle and in a different plane from the first cam means, (e) a stirrup bar substantially surrounding said camming member positioned for edgewise engagement with said driving element during rotation of said camming member through a predetermined extent of angular movement from a door closed position toward the opened door position, (f) a bearing member mounted in a different plane on said stirrup bar and positioned for engagement with said first cam means upon said camming member reaching said predetermined extent of angular movement, and (g) means continuously forcing said stirrup bar toward said camming member for urging the camming member to rotate said spindle in the door closing direction.

6. A door closing mechanism for swinging doors comprising (a) a rotatable spindle having driving connection with the door on the pivot axis thereof, (b) a camming member fixed on the spindle for rotation therewith upon swinging movement of the door, (c) said camming member comprising a symmetrical pair of oppositely disposed arms extending radially from the spindle and each of said arms terminating in a first radially facing cam means of expanding radius, (d) a driving element on each of said arms disposed radially toward the spindle adjacent the respective cam means, (e) a moveable stirrup substantially surrounding said camming member having a stirrup bar positioned for edgewise engagement with both of said driving elements when said camming member is at a door closed position, (1) said stirrup bar engaging one of said driving elements as the camming member is rotated in one direction to a predetermined extent of angular movement and engaging the other said driving element while the camming member is rotated through a similar extent of angular movement in the opposite direction, (f) a pair of bearing means mounted in a different plane and in laterally spaced relation on said stirrup bar and each of said bearing means being symmetrically positioned for engagement by the cam means on a respective one of said camming member arms upon said camming member being rotated beyond said predetermined extent of angular movement, and (g) resilient means for normally urging said stirrup in the direction to hold the stirrup bar in engagement with said camming member.

7. A door closing mechanism as defined by claim 6 wherein the driving element and bearing means are rollers journaled on axes parallel with the axis of the spindle and wherein the driving elements are disposed in axially spaced relation with the second bearing means.

8. A door closing mechanism as defined by claim 6 wherein the camming member comprises a pair of geometrically congruent plates axially spaced apart and aligned on said spindle and each having a pair of symmetrically disposed arms extending radially from the spindle, the said driving elements are sandwiched between the respective axially spaced pairs of said arms, and each of said bearing means comprises a pair of rollers journaled on a common axis parallel with the axis of the spindle, and one of the rollers of each said pair being on a respective side of said stirrup bar for engaging a respective one of said camming member plates.

References Cited by the Examiner

UNITED STATES PATENTS

| | | | |
|---|---|---|---|
| 1,120,544 | 12/1914 | Rosentreter | 16—55 |
| 2,603,818 | 7/1952 | Carlson | 16—55 |
| 2,673,367 | 3/1954 | Ferguson | 16—55 |
| 2,700,175 | 1/1955 | Carlson | 16—55 X |
| 2,786,226 | 3/1957 | Ferguson | 16—55 |
| 2,890,474 | 6/1959 | Ferguson | 16—55 |
| 2,911,210 | 11/1959 | Ferguson | 16—55 X |

PATRICK A. CLIFFORD, *Primary Examiner.*

DONLEY J. STOCKING, *Examiner.*